United States Patent Office 3,504,428
Patented Apr. 7, 1970

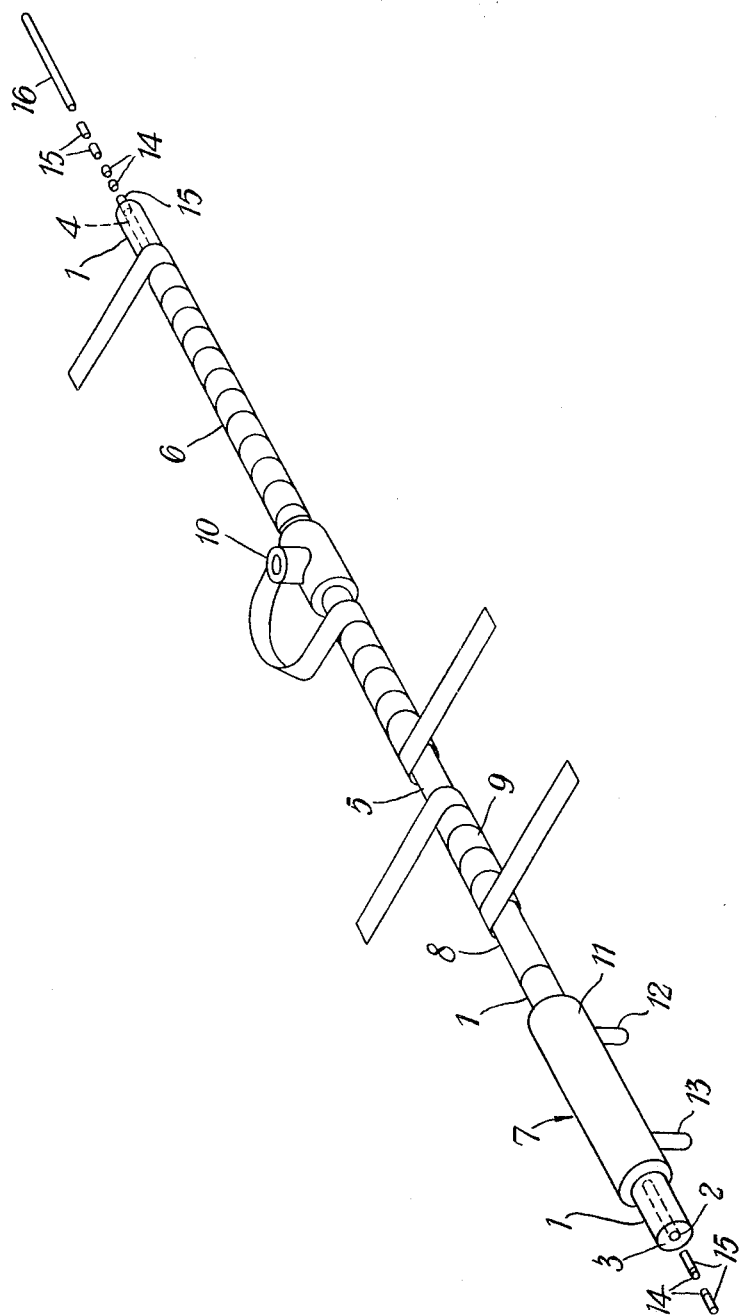

3,504,428
BONDING OF DISSIMILAR METALS
TO ONE ANOTHER
Derek Oscar Walter, Stanmore, and Reginald James Newman, Bexley Heath, England, assignors to Johnson, Matthey & Company Limited, London, England
Filed Aug. 11, 1965, Ser. No. 478,941
Claims priority, application Great Britain, Aug. 13, 1964, 33,014/64
Int. Cl. B23k 31/02
U.S. Cl. 29—487          5 Claims

ABSTRACT OF THE DISCLOSURE

Pieces, e.g., billets of two dissimilar metals capable upon heating of forming an eutectic alloy are brought together in mutual contact and the pieces, or at least their confronting faces; are heated to a temperature just short of the eutectic-forming temperature; are thereupon briefly further heated to above the eutectic-forming temperature for a period only long enough to form a minimum amount of eutectic alloy necessary for an adequate bond between the two pieces; and thereafter cooling the interface to solidify the bonding eutectic. This stepwise heating and subsequent cooling may be effected in a thick walled silica heating tube, by means of externally disposed heating and cooling means.

---

This invention relates to improvements in and relating to the bonding of dissimilar metals to one another and is more particularly, but not exclusively, concerned with the bonding together of two dissimilar metal billets or slugs to form a composite billet or slug, which may be used, for example, for the manufacture of bimetallic electrical contacts.

Bimetallic electrical contacts, particularly rivet-type contacts, usually consist of a shank portion of copper and a head portion of silver, which forms the contact face. Such contacts may be made by bonding together a billet or slug of copper and a billet or slug of silver and subsequently subjecting the so-formed composite billet or slug to an upsetting operation to deform the silver portion to form the said portion into a disc-like head, which constitutes the effective contact face of the finished contact.

One method of effecting the bonding together of the copper and silver billet is that of liquid-phase eutectic bonding in which the copper and silver parts are brought into mutual contact and heated to a temperature at, or above, that at which the formation of liquid eutectic alloy takes place, whereby on subsequent cooling and solidification an effective metallurgical bond is produced between the copper and silver billets at their mutually contacting interfaces.

Now, whilst this method of bonding results in a satisfactory uniting together of the two billets, it has been found to suffer from the disadvantages of westage of metal, in that more metal is generally melted than is necessary to effect an efficient bond with the result that an undesirable amount of eutectic alloy is formed, which merely serves to disfigure the bond.

The object of this invention is to overcome the aforesaid disadvantages and to provide an improved method for the liquid-phase bonding of dissimilar metals, which are together capable of forming a eutectic alloy.

According to one feature of this invention, there is provided a method of bonding together two dissimilar metals capable, on heating together, of forming a eutectic alloy which comprises the steps of heating at least the mutually contacting interfaces of the two metals to a temperature above the eutectic melting temperature and maintaining said temperature for a period sufficient only to allow of the formation of a minimum amount of eutectic alloy required to effect an efficient metallurgical bond at the said interfaces, and then cooling said eutectic alloy to solidify and form a bond between said metal parts.

The invention will be found to be particularly suitable for use in the manufacture of bimetal electrical contacts, such as the aforesaid copper-silver rivet-type contacts.

In carrying out the invention in practice, two dissimilar metal parts are advantageously brought to the required temperature by feeding them in mutual contact through a tube, an intermediate portion of which is heated to a temperature somewhat above the eutectic-forming temperature of the two metals, the remainder of the tube being at a temperature below said eutectic-forming temperature. For example, in the case of copper and silver, the eutectic-forming temperature of which is 778° C., the intermediate portion of the tube may be heated to a temperature of about 800° C.

The initial portion of the tube located between the inlet end thereof and said intermediate portion is preferably heated to a temperature just below the eutectic-forming temperature and the portion of the tube located between the intermediate portion and the exit end thereof may include fluid-coolant means.

Advantageously, the temperature of the initial portion of the tube is automatically varied in dependence on the speed of movement of the metal parts through the said tube. This variation may be effected by the action of a thermocouple operatively associated with a source of variable power supply.

The temperature of the intermediate portion above the eutectic-forming temperature preferably varies in dependence on the temperature of the metal parts entering the said portion.

The heating tube is preferably a thick walled silica tube heated by means of externally wound resistance heating wires or tapes.

According to another feature of the invention, there is provided apparatus for bonding together two dissimilar metal parts capable, on heating, of forming a eutectic alloy, comprising an elongated tube through which the metal parts are fed, means for feeding said metal parts in mutual contact through said tube, means associated with an initial portion of said tube for heating said metal parts to a temperature below the eutectic-forming temperature of said two dissimilar metals; means associated with an adjacent intermediate portion of said tube for heating the metal parts passing therethrough to a temperature above the eutectic-forming temperature and means adjacent the exit end of said tube for cooling the metal parts to solidify the eutectic alloy formed in the intermediate portion and effect the bond.

In order that the invention may be fully understood, one embodiment thereof will now be described by way of example as applied to the production of silver-copper bimetal electrical contact billets, by reference to the accompanying diagrammatic drawing, the single figure of which is a perspective view of bonding apparatus embodying the invention.

Referring to the drawing, 1 denotes an elongated cylindrical silica tube having a small diameter bore 2 surrounded by a thick wall 3. Around a portion of this tube 1, extending from the inlet end 4 thereof to a point thereof indicated by the numeral 5, is wound a ribbon-type electrical resistance heating element 6 connected to a suitable source of power (not shown) for preheating the metal billets passing along the tube 1.

Adjacent this point 5 and between it and the exit end portion 7 of the tube 1 is an intermediate portion 8 which also carries an externally wound ribbon-type electrical resistance heating element 9 for heating the metal parts to above the eutectic-forming temperature. In the present instance, this portion 8 is heated to a temperature of about 800° C., the silver-copper eutectic temperature being 778° C. 10 indicates a pipe communicating with the bore 2 of the tube 1, for the supply of hydrogen to the said bore 2 during the bonding process.

The aforesaid exit end portion 7 of the tube 1 is provided with a water-cooling jacket 11 having an inlet pipe 12 and an outlet pipe 13 for the cooling water.

14 and 15 indicate two silver and two copper billets or slugs in feeding position ready to be introduced by any suitable means such as the push-rod 16. The slugs are of a size such that they can slide freely in the bore 2 of the tube 1 but cannot move substantially out of coaxial alignment with one another.

The above described apparatus is used in the following manner for the continuous production of silver-copper bimetal contacts. A single copper slug 15 followed by two silver slugs 14, and then two further copper slugs 15 are aligned, as shown in the drawing at the inlet end 4 of the tube 1, and are pushed into the bore 2 thereof by means of the push-rod 16. This operation for introducng two silver and two copper slugs is repeated at any suitable rate, which may vary from 40 to 180 such operations per minute. In this way the coaligned slugs are gradually fed along the bore 2 of the tube 1 and are gradually heated to a suitable temperature below the silver-copper eutectic-forming temperature, i.e. 778° C., as they progress beneath the resistance heating element 6 by conduction and radiation through the wall 3 of the tube 1. During this procedure, hydrogen is introduced through the inlet 10.

When the slugs reach the point 5 they have attained a fairly steady temperature just below 778° C. They now pass into the intermediate portion 8 of the tube 1 where they are rapidly heated in a similar manner to a temperature of 800° C., that is to say above the pertaining eutectic temperature, as a result of which some liquid silver-copper eutectic alloy is formed, the amount of which depends on the relation between the temperature to which the slugs are heated by the element 9, and the speed with which they pass through this intermediate portion.

The slugs now pass immediately into the exit end portion 7 of the tube 1 where they are rapidly cooled to cause the molten eutectic alloy to solidify and bond the contiguous silver-copper slugs together. As no bonding occurs between contiguous copper or contiguous silver slugs, the bonded articles issuing from the tube 1 consist, as shown in the drawing, of successive bimetal billets composed of a copper slug eutectically bonded to a silver slug.

The temperature to which the slugs are heated during passage through the initial heating portion of the tube 1 is controlled by means of a thermocouple not shown in the drawing, arranged to measure the temperature of the heating element 6 at the end thereof nearest the intermediate portion 5 of the tube 1. The thermocouple is connected to a suitable source of variable power supply, such for example, as a thyristor device or saturable reactor. If the speed of travel of the slugs at the region of the thermocouple should, for any reason, increase, the amount of heat being removed from the heating element 6 will also rise, and the thermocouple will indicate a lower temperature and thus will cause more heat to be supplied. However, due to the poor thermal conductivity of the silica tube 1, the slugs, when travelling faster, will actually drop in temperature. To compensate for this, the distance between the heating elements 6 and 9 is adjusted so as to increase the temperature at this intermediate portion; the passing slugs are thus raised to a temperature higher than normal above the eutectic temperature, that is to say, higher than 800° C., but owing to their increased speed, the slugs receive this additional heat for a shorter time. As will be readily appreciated, by suitably balancing the above conditions, a substantially uniform quantity of liquid eutectic alloy can be constantly produced at the contiguous copper-silver interfaces of the slugs, despite variations of ±5% in the rate of travel of the slugs through the silica tube.

Although in the above, one embodiment of the invention has been described by way of example as applied to the continuous production of copper-silver bimetal electrical contact billets, it is to be understood that the invention is in no way limited thereto or thereby. For example, any other two metals, which are capable together of forming a eutectic alloy on heating, may be used instead of copper and silver, and any other suitable method of heating may be used.

Moreover, it is not necessary for a plurality of articles to be produced as a continuous process, as obviously a single article only formed of a single composite billet may be formed at any one time.

It is further to be understood, that the invention is intended to include within its scope any composite bimetallic billet for any purpose whatever, when made by the method of the invention.

What is claimed is:

1. A method of bonding together two dissimilar metal members capable of forming a eutectic alloy on being heated when in contact, which includes the steps of feeding along a guide which is a thick-walled silica tube heated by means of externally wound resistance heating wires or tapes at least one pair of said dissimilar members in such manner as to produce contact between said members, heating, during said feeding, at least the mutually contacting faces of said members to a temperature above the melting point of the eutectic alloy for a period sufficient to melt said contacting faces and to cause the formation of enough liquid eutectic alloy to effect a complete metallurigical bond at said contacting faces without significant deformation in the region of the faces and then cooling said faces to cause said eutectic alloy to solidify and form the bond between said members.

2. A method as defined in claim 1, wherein the two dissimilar metal members are heated to the required temperature by feeding them in mutual contact through a tube an intermediate portion of which is at a temperature above the eutectic-forming temperature of the metals and the remainder of which is at a temperature below said eutectic-forming temperature.

3. A method as defined in claim 1, wherein the metal members to be bonded are the constituent parts of a bimetallic electrical contact.

4. A method as defined in claim 3, wherein the metal members to be bonded consist of a silver billet and a copper billet.

5. A method as defined in claim 4 for the continuous production of bimetal electrical contact billets wherein a plurality of mutually contacting silver and copper billets are mechanically fed through the heating tube.

(References on following page)

References Cited

UNITED STATES PATENTS

| | | | |
|---|---|---|---|
| 2,813,048 | 11/1957 | Pfann | 29—498 XR |
| 2,882,587 | 4/1959 | McCowan Vinger et al. 29—497.5 XR | |
| 3,022,190 | 2/1962 | Feldman | 29—487 XR |
| 3,127,496 | 3/1964 | Finzi et al. | 219—10.71 |
| 3,208,129 | 9/1967 | Talbot et al. | 29—155.55 |
| 3,372,212 | 3/1968 | Gayet et al. | 219—10.71 XR |

FOREIGN PATENTS 315,253   5/1918   Germany.

OTHER REFERENCES

"Constitution of Binary Alloys," by Dr. M. Hansen, 1958, see p. 18.

CHARLIE T. MOON, Primary Examiner

R. B. LAZARUS, Assistant Examiner

U.S. Cl. X.R.

29—498, 504